US010581105B2

(12) United States Patent
DuFresne

(10) Patent No.: US 10,581,105 B2
(45) Date of Patent: Mar. 3, 2020

(54) FUEL CELLS UTILIZING LIQUID METAL ALLOY REDUCING AGENTS AND FUEL CELL SYSTEMS INCLUDING THE SAME

(71) Applicant: Paul E. DuFresne, Portland, OR (US)

(72) Inventor: Paul E. DuFresne, Portland, OR (US)

(*) Notice: Subject to any disclaimer, the term of this patent is extended or adjusted under 35 U.S.C. 154(b) by 395 days.

(21) Appl. No.: 15/459,436

(22) Filed: Mar. 15, 2017

(65) Prior Publication Data
US 2017/0279149 A1 Sep. 28, 2017

Related U.S. Application Data

(60) Provisional application No. 62/311,555, filed on Mar. 22, 2016.

(51) Int. Cl.
H01M 8/22 (2006.01)
H01M 8/04082 (2016.01)
H01M 8/0662 (2016.01)
H01M 4/92 (2006.01)

(52) U.S. Cl.
CPC ............ H01M 8/22 (2013.01); H01M 4/92 (2013.01); H01M 8/04201 (2013.01); H01M 8/0662 (2013.01); H01M 2300/0028 (2013.01)

(58) Field of Classification Search
None
See application file for complete search history.

(56) References Cited

U.S. PATENT DOCUMENTS 3,325,382 A * 6/1967 Le Duc ..................... C25B 1/18
205/343
3,507,703 A 4/1970 Heredy
3,607,417 A * 9/1971 McRae ................... H01M 2/14
429/405
3,911,284 A 10/1975 Skala
3,911,288 A 10/1975 Skala
8,338,038 B2 12/2012 Coors et al.
2011/0223460 A1* 9/2011 Farmer ............... H01M 2/1646
429/104

OTHER PUBLICATIONS

Das et al., "Sodium-oxygen batteries: a new class of metal-air batteries," *Journal of Materials Chemistry A*, pp. 12623-12629, Jun. 2014.
Jorné et al., "Electrodeposition of the alkali metals from propylene carbonate," *Journal of Applied Electrochemistry 5*, Chapman and Hall Ltd., pp. 279-290, 1975.

* cited by examiner

*Primary Examiner* — Wojciech Haske
(74) *Attorney, Agent, or Firm* — Dascenzo Intellectual Property Law, P.C.

(57) ABSTRACT

Fuel cells utilizing liquid sodium-potassium alloy (NaK) reducing agent and fuel cell systems including the same. The fuel cells include a housing defining a housing volume and a reducing agent-containment structure defining a reducing agent-containment volume. The fuel cells also include a volume of NaK reducing agent extending within the reducing agent-containment volume and an anode conductor extending in electrical contact with the NaK reducing agent such that the NaK reducing agent forms at least a portion of an anode electrode of the fuel cell. The fuel cells further include a cathode electrode that extends within the housing volume and is spaced-apart from the NaK reducing agent, an electrolyte present within the housing volume, and an oxidizing agent supply structure configured to provide an oxidizing agent to the housing volume.

25 Claims, 2 Drawing Sheets

FUEL CELLS UTILIZING LIQUID METAL ALLOY REDUCING AGENTS AND FUEL CELL SYSTEMS INCLUDING THE SAME

RELATED APPLICATION

This application claims priority to U.S. Provisional Patent Application No. 62/311,555, which was filed on Mar. 22, 2016, and the complete disclosure of which is hereby incorporated by reference.

FIELD OF THE DISCLOSURE

The present disclosure relates generally to fuel cells utilizing a eutectic liquid metal alloy fuel with a low melting temperature and to fuel cell systems including the fuel cells.

BACKGROUND OF THE DISCLOSURE

Fuel cells are electrochemical devices that utilize an oxidation-reduction reaction between two reactants (i.e., a reducing agent and an oxidizing agent) to convert chemical energy into electricity. In general, fuel cells are configured such that bulk reactants do not directly contact one another and electrons, which are transferred between the reactants as part of the oxidation-reduction reaction, must flow through an external circuit. This flow of electrons through the external circuit permits an electrical potential, which is generated by the oxidation-reduction reaction and produces the electron flow, to be utilized to electrically power an external device.

In contrast to batteries, which have a finite storage capacity and sometimes may be "rechargeable," fuel cells may be referred to herein as "refillable." As such, fuel cells generally are configured such that the reactants may be supplied to the fuel cell, replenished, and/or refilled, thereby permitting a theoretically unlimited operating time for the fuel cell. In addition, reaction products generally are removed from the fuel cell. For many prior art fuel cells, these reaction products may be gaseous, which may make it difficult to recover and/or recycle the reaction products. Thus, fuel cells may be desirable for situations in which the storage capacity of conventional batteries is insufficient to provide a desired amount of electrical power over a desired timeframe.

While many types of fuel cells have been developed, they all suffer from inherent limitations. As an example, fuel cells that utilize hydrogen gas as the reducing agent and oxygen as the oxidizing agent are known. However, because hydrogen is a gas at all but extremely low temperatures (−252.88° C. at 1 ATM), it is difficult to store in quantities sufficient to provide a significant amount of electrical power over a significant period of time. Thus, there exists a need for a fuel cell that uses reducing agents that are stored in liquid form, and that remain liquid at temperature ranges that encompass those commonly encountered on the surface of the earth, and that do not require extremely high pressures to remain liquid.

SUMMARY OF THE DISCLOSURE

Fuel cells utilizing a liquid sodium-potassium alloy (NaK) reducing agent and halogen oxidizing agent and fuel cell systems including the same are disclosed herein. The fuel cells include a housing defining a housing volume and a reducing agent-containment structure defining a reducing agent-containment volume. The fuel cells also include an anode conductor extending in electrical contact with the NaK reducing agent such that the NaK reducing agent forms at least a portion of an anode electrode of the fuel cell. The fuel cells further include a cathode electrode that extends within the housing volume and is spaced-apart from the NaK reducing agent. The fuel cells also include an electrolyte present within the housing volume. The electrolyte is in fluid contact with the cathode electrode and extends between the NaK reducing agent and the cathode electrode. The fuel cells also include an oxidizing agent supply structure configured to provide an oxidizing agent to the housing volume.

DETAILED DESCRIPTION AND BEST MODE OF THE DISCLOSURE

Figure 1:
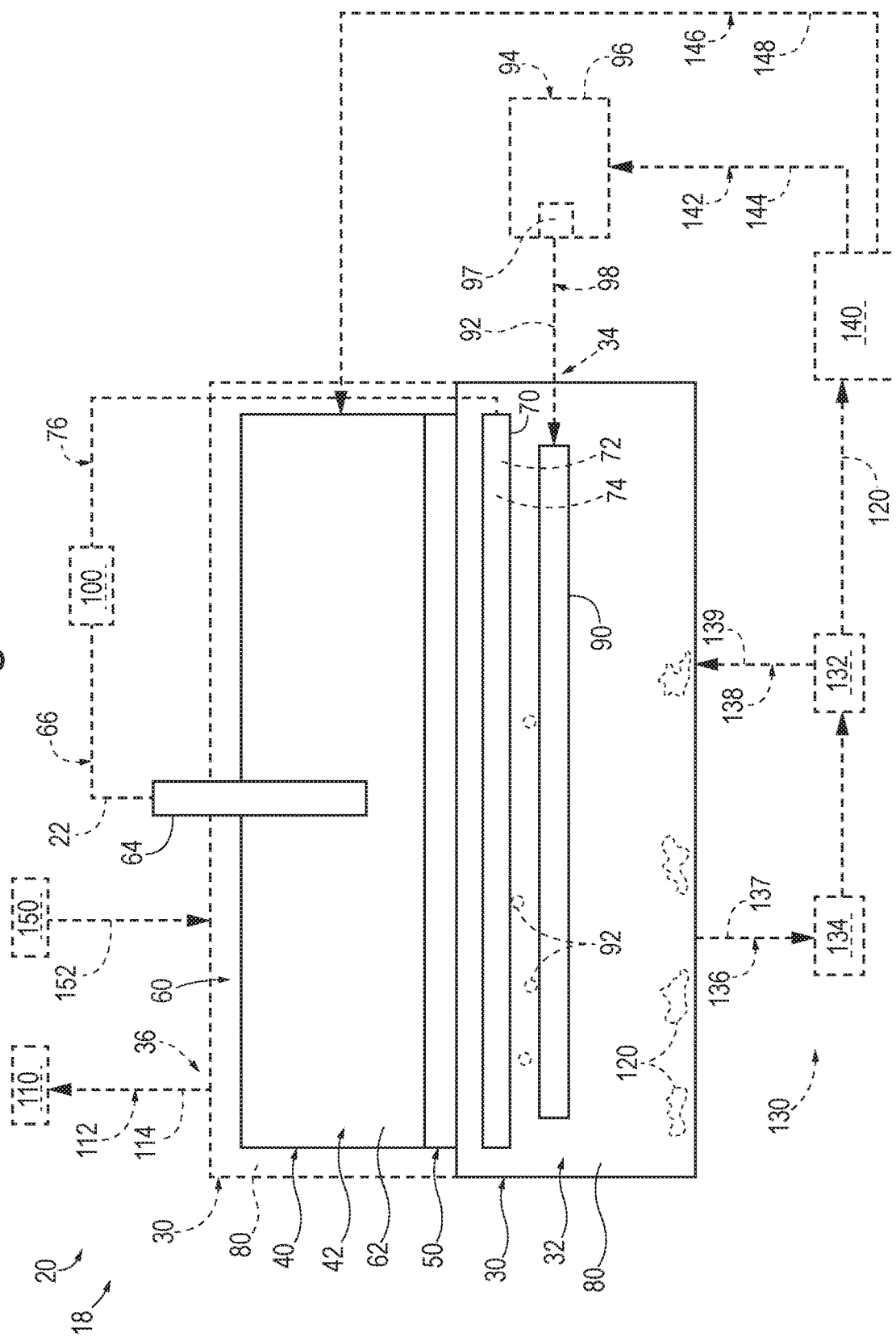
FIG. 1 is a schematic representation of examples of a fuel cell system including a fuel cell, according to the present disclosure.
Figure 2:
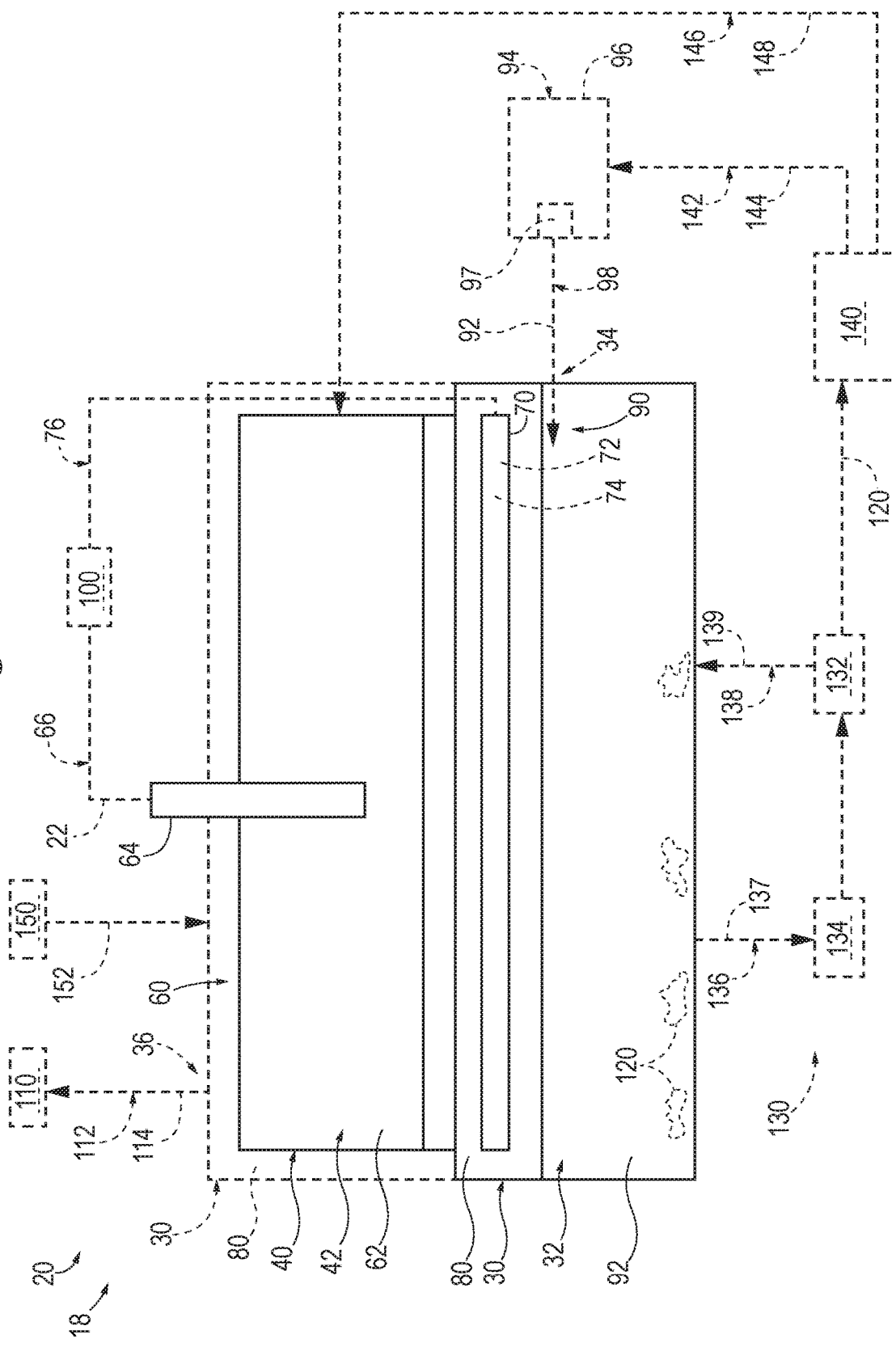
FIG. 2 is a schematic representation of examples of a fuel cell system including a fuel cell, according to the present disclosure.

FIGS. 1-2 are schematic representations of examples of fuel cell systems 18 that may include a fuel cell 20 according to the present disclosure. In general, elements that are likely to be included are illustrated in solid lines, while elements that are optional are illustrated in dashed lines. However, elements that are shown in solid lines may not be essential and, in some embodiments, may be omitted without departing from the scope of the present disclosure.

As illustrated in FIGS. 1-2, fuel cell 20 includes a housing 30 that defines, surrounds, and/or bounds a housing volume 32. Fuel cell 20 further includes a reducing agent-containment structure 40 that defines, surrounds, and/or bounds a reducing agent-containment volume 42. As illustrated in FIG. 1, fuel cell 20 may include a porous diffusion barrier 50 that defines and/or bounds at least a portion of reducing agent-containment volume 42 and housing volume 32 and that is in fluid communication with both housing volume 32 and reducing agent-containment volume 42. As an example, and as illustrated, porous diffusion barrier 50 may extend between, may spatially separate, and/or may fluidly separate reducing agent-containment volume 42 and housing volume 32.

Returning more generally to FIGS. 1-2, fuel cell 20 also includes a volume of liquid metal alloy reducing agent 62. Liquid metal alloy reducing agent 62 also may be referred to herein as liquid metal alloy fuel 62 and/or as liquid reducing agent 62, and examples of the liquid metal alloy reducing agent are disclosed herein. The liquid metal alloy reducing agent extends, or is contained, within reducing agent-containment volume 42 and may extend in fluid contact with porous diffusion barrier 50, as illustrated in FIG. 1. Additionally or alternatively, the liquid metal alloy reducing agent may extend in direct fluid contact with an electrolyte 80, as illustrated in FIG. 2.

Returning to FIGS. 1-2, fuel cell 20 further includes an anode conductor 64 that extends in electrical contact with liquid metal alloy reducing agent 62 such that the liquid metal alloy reducing agent forms and/or defines at least a portion, or even an entirety, of an anode electrode 60 of the fuel cell. Stated another way, liquid metal alloy reducing agent 62 is electrically conductive and extends between, spatially separates, and/or electrically separates anode conductor 64 and porous diffusion barrier 50, when present, and/or extends between, spatially separates, and/or electrically separates anode conductor 64 and electrolyte 80. As such, liquid metal alloy reducing agent 62 may function as anode electrode 60 within fuel cell 20.

Fuel cell 20 also includes a cathode electrode 70 that is located within housing volume 32. Cathode electrode 70 may be spaced-apart from porous diffusion barrier 50, as illustrated in FIG. 1, and/or may be spaced-apart from liquid metal alloy reducing agent 62, as illustrated in FIGS. 1-2. Porous diffusion barrier 50 may extend between, or spatially and/or electrically separate, cathode electrode 70 and liquid metal alloy reducing agent 62, as illustrated in FIG. 1. Additionally or alternatively, electrolyte 80 may extend between, or spatially and/or electrically separate, cathode electrode 70 and liquid metal alloy reducing agent 62, as illustrated in FIGS. 1-2

As discussed, the fuel cell further includes electrolyte 80, which extends within housing volume 32 and is in fluid contact with cathode electrode 70. The electrolyte may be in fluid contact with porous diffusion barrier 50, as illustrated in FIG. 1. Additionally or alternatively, the electrolyte may extend between, spatially separate, and/or electrically separate liquid metal alloy reducing agent 62 and cathode electrode 70, as illustrated in FIGS. 1-2. Fuel cell 20 also includes an oxidizing agent supply structure 90, which is configured to supply an oxidizing agent 92 to housing volume 32.

In the embodiment of FIG. 1, porous diffusion barrier 50 may provide a physical barrier that separates liquid metal alloy reducing agent 62 from electrolyte 80 but that also permits the liquid metal alloy reducing agent to diffuse therethrough and into the electrolyte. In the embodiment of FIG. 2, liquid metal alloy reducing agent 62 and electrolyte 80 may be immiscible in one another and may have different densities. These differences between the liquid metal alloy reducing agent and the electrolyte may cause phase separation therebetween, as illustrated. However, the liquid metal alloy reducing agent may have a finite solubility within the electrolyte, thereby permitting dissolution of a portion of the liquid metal alloy reducing agent into the electrolyte.

Liquid metal alloy reducing agent 62 may include and/or be any suitable reducing agent that is electrically conductive and that also functions as a reducing agent within fuel cell 20. Examples of liquid metal alloy reducing agent 62 include liquid sodium-potassium alloy (NaK) reducing agent and/or gallium-indium-tin (galinstan) alloys.

NaK reducing agent 62, when utilized, also may be referred to herein liquid NaK reducing agent 62 and/or as electrically conductive liquid NaK reducing agent 62. NaK reducing agent 62 may be utilized in fuel cells 20 because of its low melting point (approximately −12 degrees Celsius for the eutectic alloy), because of the wide availability of both sodium and potassium, and/or because of the potential to recycle a reaction product 120 of fuel cell 20 back to NaK reducing agent 62 and oxidizing agent 92, as discussed in more detail herein.

During operation of fuel cells 20 that utilize NaK reducing agent 62, and as illustrated in FIG. 1, porous diffusion barrier 50 may permit fluid contact between NaK reducing agent 62 and electrolyte 80. Additionally or alternatively, and as illustrated in FIG. 2, fuel cell 20 may provide direct fluid and/or bulk contact between the NaK reducing agent and the electrolyte.

In either embodiment, NaK reducing agent 62 may dissociate into sodium cations (i.e., $Na^+$ ions) and potassium cations (i.e., $K^+$ ions) through dissolution, or at least partial dissolution, within electrolyte 80. However, at least a portion of the electrons released by dissociation of the NaK reducing agent may not be conducted from NaK reducing agent 62 and into electrolyte 80. Instead, these electrons may be conducted from NaK reducing agent 62 by anode conductor 64 and may be referred to herein as an electrical output 22 of the fuel cell. The electrons may flow, via anode conductor 64 and/or an anode electrical conduit 66, to an applied load 100, such as to power the applied load. The electrons then may flow, via a cathode electrical conduit 76, to cathode electrode 70.

In the example of FIG. 1, oxidizing agent 92 may be provided to housing volume 32 in the form of a gas, or gaseous, oxidizing agent 92 and may dissolve within electrolyte 80. In the example of FIG. 2, oxidizing agent 92 may be provided to housing volume 32 in the form of a liquid oxidizing agent 92. In this embodiment, oxidizing agent 92 and electrolyte 80 may be immiscible in one another and may have different densities. These differences between the oxidizing agent and the electrolyte may cause phase separation therebetween, as illustrated. However, the oxidizing agent may have a finite solubility within the electrolyte, thereby permitting dissolution of a portion of the oxidizing agent within the electrolyte.

The oxidizing agent, or the dissolved oxidizing agent, may react with the sodium and/or potassium cations, which are dissolved within the electrolyte, on and/or near cathode electrode 70 to produce a reaction product 120. Electrons that are necessary to complete the reaction may be provided from the cathode electrode via anode electrode 60, anode conductor 64, anode electrical conduit 66, applied load 100, and cathode electrical conduit 76. Thus, fuel cell 20 may utilize electrons, which are transferred between reactants during reaction of NaK reducing agent 62 with oxidizing agent 92, to provide electrical output 22, or an electric current, to applied load 100.

NaK reducing agent 62, when utilized, may include and/or be any suitable liquid sodium-potassium alloy. It may be desirable for NaK reducing agent 62 to remain in liquid form over a wide range of temperatures and/or at all temperatures that are likely to be encountered by fuel cell 20 during operation thereof. As such, NaK reducing agent 62 may be a eutectic, or at least substantially eutectic, mixture of sodium and potassium, such as a mixture that is approximately 22 weight percent (wt %) sodium and 78 wt % potassium. However, this specific composition is not required of all embodiments.

As examples, the NaK reducing agent may have a potassium composition of at least 70 wt %, at least 72 wt %, at least 74 wt %, at least 76 wt %, at least 78 wt %, and/or at least 80 wt % potassium. Additionally or alternatively, the NaK reducing agent may have a potassium composition of at most 90 wt %, at most 88 wt %, at most 86 wt %, at most 84 wt %, at most 82 wt %, at most 80 wt %, at most 78 wt %, and/or at most 76 wt % potassium. As additional examples, the NaK reducing agent may have a sodium composition of at least 14 wt %, at least 16 wt %, at least 18 wt %, at least 20 wt %, at least 22 wt %, and/or at least 24 wt % sodium. Additionally or alternatively, the NaK reducing agent may have a sodium composition of at most 34 wt %, at most 32 wt %, at most 30 wt %, at most 28 wt %, at most 26 wt %, at most 24 wt %, at most 22 wt %, and/or at most 20 wt % sodium.

The NaK reducing agent, when utilized, also may have one or more additional components. As an example, the inclusion of magnesium and/or calcium may provide protection from water contamination. The additional components, when present, may comprise at least 0.01 wt %, at least 0.05 wt %, at least 0.1 wt %, at least 0.5 wt %, at least 1 wt %, at most 5 wt %, at most 2.5 wt %, at most 1 wt %, at most 0.5 wt %, and/or at most 0.1 wt % of the NaK reducing agent.

Oxidizing agent 92 may include and/or be any suitable oxidizing agent that may be provided to fuel cell 20 via oxidizing agent supply structure 90, that may be at least partially soluble within electrolyte 80, and/or that may react with sodium and potassium cations on, at, and/or near cathode electrode 70 to produce and/or generate reaction product 120. As discussed, oxidizing agent 92 may be a gaseous oxidizing agent, may be gaseous at, or near, atmospheric pressure, may be a liquid oxidizing agent, and/or may be liquid at, or near, atmospheric pressure.

Additionally or alternatively, oxidizing agent 92 may be a liquid at 21 degrees Celsius and at relatively moderate pressures. As examples, oxidizing agent 92 may be a liquid at pressures that are greater than 400 kilopascals (kPa), greater than 500 kPa, greater than 600 kPa, greater than 700 kPa, or greater than 800 kPa. Such an oxidizing agent 92 economically may be stored in liquid form and may be vaporized upon use within fuel cell 20, thereby permitting a much greater storage density than may be accomplished utilizing an oxidizing agent that liquefies at significantly higher pressures.

An example of oxidizing agent 92 includes chlorine, liquid chlorine, or chlorine gas. Chlorine is a liquid at 21 degrees Celsius when the pressure is greater than approximately 695 kPa. Additional examples of oxidizing agent 92 include a halogen, a liquid halogen, a halogen gas, bromine, liquid bromine, and/or bromine gas. When oxidizing agent 92 includes chlorine, the following reactions may occur within fuel cells 20, which utilize NaK reducing agent 62, at, on, and/or near cathode electrode 70:

  (1)

$$2Na^+ + Cl_2 + 2e^- \rightarrow 2NaCl$$

  (2)

$$2K^+ + Cl_2 + 2e^- \rightarrow 2KCl$$

wherein $Na^+$ is a sodium cation, $K^+$ is a potassium cation, $Cl_2$ is diatomic chlorine, $e^-$ is an electron, NaCl is a sodium chloride salt, and KCl is a potassium chloride salt.

As discussed, fuel cell 20 is constructed such that electrons ($e^-$) needed for reaction according to equations (1) and (2) are separated from NaK reducing agent 62 upon ionization of the NaK reducing agent into sodium and potassium cations. These electrons provide electrical output 22 to applied load 100 before flowing to cathode electrode 70, where they may be utilized to facilitate these reactions.

It is within the scope of the present disclosure that a spacing, an average spacing, a distance, and/or an average distance between cathode electrode 70 and porous diffusion barrier 50 (in the embodiment of FIG. 1), between cathode electrode 70 and liquid metal alloy reducing agent 62 (in the embodiment of FIGS. 1-2), between cathode electrode 70 and oxidizing agent supply structure 90 (in the embodiment of FIG. 1), and/or between cathode electrode 70 and oxidizing agent 92 (in the embodiment of FIG. 2) may be selected for improved performance of fuel cells 20. As an example, sodium and potassium ions may diffuse, within electrolyte 80, to cathode electrode 70. As such, the distance between the porous diffusion barrier and the cathode electrode and/or the distance between the liquid metal alloy reducing agent and the cathode electrode may regulate an overall efficiency and/or current density of fuel cells 20.

As another example, oxidizing agent 92 may diffuse, within electrolyte 80, to cathode electrode 70. As such, the distance between the oxidizing agent supply structure and the cathode electrode and/or the distance between the oxidizing agent and the cathode electrode may regulate the overall efficiency and/or current density of fuel cells 20.

As yet another example, accumulation of reaction product 120 may restrict flow of electrolyte 80 among the oxidizing agent supply structure, the cathode electrode, and the porous diffusion barrier. As such, the distance between cathode electrode 70 and porous diffusion barrier 50 and/or between cathode electrode 70 and oxidizing agent supply structure 90 may be selected to facilitate removal of the reaction product. Examples of the distance between cathode electrode 70 and porous diffusion barrier 50 and/or between cathode electrode 70 and oxidizing agent supply structure 90 include distances of at least 0.1 millimeter (mm), at least 0.25 mm, at least 0.5 mm, at least 1 mm, at least 2 mm, at least 3 mm, at least 4 mm, at least 5 mm, at most 10 mm, at most 8 mm, at most 6 mm, at most 4 mm, and/or at most 2 mm.

As illustrated in dashed lines in FIGS. 1-2, fuel cell 20, or a fuel cell system 18 that includes fuel cell 20, may include an oxidizing agent source 94. Oxidizing agent source 94 may be configured to provide oxidizing agent 92 to oxidizing agent supply structure 90, such as via an oxidizing agent supply conduit 98. Under these conditions, housing 30 may include an oxidizing agent inlet 34, which may be configured to permit the oxidizing agent supply conduit to extend from oxidizing agent source 94 into housing volume 32 and/or to oxidizing agent supply structure 90.

Oxidizing agent source 94 may include and/or be any suitable structure that may be configured to contain oxidizing agent 92, house oxidizing agent 92, generate oxidizing agent 92, and/or provide oxidizing agent 92 to oxidizing agent supply structure 90. As an example, oxidizing agent source 94 may include and/or be a pressure vessel 96 that is configured to maintain the oxidizing agent as a liquid oxidizing agent prior to the oxidizing agent exiting the oxidizing agent source and/or prior to the oxidizing agent being provided to the oxidizing agent supply structure. As another example, oxidizing agent source 94 may include an oxidizing agent pressure regulator 97, which may be configured to control and/or regulate a pressure of oxidizing agent 92 that is provided to oxidizing agent supply structure 90.

As discussed, the fuel cells disclosed herein generally may utilize NaK reducing agent 62 as the liquid metal alloy reducing agent for fuel cell 20 and a halogen, such as chlorine or bromine, as the oxidizing agent. The combination of NaK reducing agent and chlorine oxidizing agent has a high energy density (approximately 60% of that of gasoline by weight or over 90% of that of gasoline by volume). Stated another way, the energy density of the NaK reducing agent and chlorine oxidizing agent system is comparable to that of gasoline, which makes the NaK reducing agent and chlorine oxidizing agent system more viable for transportation applications when compared to many other alternative reducing agents.

Electrolyte 80 may include and/or be any suitable material that may extend within housing volume 32, that may extend in fluid contact with both porous diffusion barrier 50 and cathode electrode 70, and/or that may extend between liquid metal alloy reducing agent 62 and the cathode electrode. In some embodiments, electrolyte 80 may include and/or be a liquid electrolyte; however, this is not required.

Electrolyte 80 may have any suitable composition, or chemical composition. As an example, electrolyte 80 may include propylene carbonate. As another example, electrolyte 80 may include aluminum chloride. As yet another example, electrolyte 80 may include hexafluorophosphate. As another example, electrolyte 80 may include and/or be an electrically conductive electrolyte 80. As yet another example, electrolyte 80 may include and/or be an electrolyte within which both liquid metal alloy reducing agent 62 and oxidizing agent 92 are soluble, are at least partially soluble, and/or are sufficiently soluble to produce a desired electric current output from fuel cell 20.

As a more specific example, electrolyte 80 may include a solution of aluminum chloride dissolved in propylene carbonate. Under these conditions, the aluminum chloride may have a concentration of at least 0.1 molal, at least 0.2 molal, at least 0.3 molal, at least 0.4 molal, at least 0.5 molal, at least 0.51 molal, and/or at least 0.6 molal. Additionally or alternatively, the aluminum chloride may have a concentration of at most 1 molal, at most 0.9 molal, at most 0.8 molal, at most 0.7 molal, at most 0.6 molal, at most 0.51 molal, at most 0.5 molal, and/or at most 0.4 molal.

In the embodiment of FIG. 2, and as discussed, electrolyte 80 may be immiscible with both liquid metal alloy reducing agent 62 and oxidizing agent 92 and may have a density that differs from that of both liquid metal alloy reducing agent 62 and oxidizing agent 92. As an example, the density of electrolyte 80 may be at most 99%, at most 98%, at most 97%, at most 96%, at most 95%, at most 94%, at most 92%, at most 90%, at most 88%, and/or at most 86% of a density of oxidizing agent 92. Additionally or alternatively, the density of electrolyte 80 may be at least 101%, at least 102%, at least 103%, at least 104%, at least 105%, at least 106%, at least 108%, at least 110%, at least 112%, and/or at least 114% of a density of liquid metal alloy reducing agent 62. Such density variations may permit the phase separated, or layered, segregation of liquid metal alloy reducing agent 62, electrolyte 80, and oxidizing agent 92 that is illustrated in FIG. 2 without the need for physical barriers therebetween.

As also discussed, both liquid metal alloy reducing agent 62 and oxidizing agent 92 may have a finite solubility within electrolyte 80. As examples, liquid metal alloy reducing agent 62 and/or oxidizing agent 92 may be soluble to a concentration of at most 100 grams per liter (g/L), at most 80 g/L, at most 60 g/L, at most 40 g/L, at most 20 g/L, at most 10 g/L, at most 5 g/L, at most 1 g/L, at most 0.5 g/L, at most 0.1 g/L, at least 0.001 g/L, at least 0.005 g/L, at least 0.01 g/L, at least 0.05 g/L, at least 0.1 g/L, at least 0.5 g/L, at least 1 g/L, at least 2 g/L, at least 4 g/L, at least 6 g/L, at least 8 g/L, and/or at least 10 g/L within electrolyte 80.

Under certain conditions, such as when oxidizing agent 92 is provided to fuel cell 20 as a gaseous oxidizing agent 92, it may be desirable to vent excess oxidizing agent from housing volume 32. Under these conditions, and as illustrated in dashed lines in FIGS. 1-2, housing 30 further may include a vent opening 36, which may be configured to permit excess oxidizing agent 114 to flow from housing volume 32.

It also may be desirable to restrict release of excess oxidizing agent 114 from fuel cell system 18. Under these conditions, fuel cell 20 further may include an oxidizing agent scrubber 110 and an excess oxidizing agent conduit 112, which may be configured to convey excess oxidizing agent 114 from vent opening 36 to the oxidizing agent scrubber. FIGS. 1-2 illustrate oxidizing agent scrubber 110 as being external to housing 30; however, this is not required, and it is within the scope of the present disclosure that at least a portion, or even all, of oxidizing agent scrubber 110 may be internal to housing 30 and/or may extend within housing volume 32.

Oxidizing agent scrubber 110 may include any suitable structure that may be configured to absorb excess oxidizing agent 114 and/or to react with excess oxidizing agent 114. As an example, and when the oxidizing agent includes chlorine, oxidizing agent scrubber 110 may include a fluid that is selected to react with the chlorine. As a more specific example, the oxidizing agent scrubber may include a solution of sodium thiosulfate in propylene carbonate.

As illustrated in dashed lines in FIGS. 1-2, fuel cell system 18 and/or fuel cell 20 thereof further may include a reaction product removal system 130 that may be configured to remove and/or separate reaction product 120 from electrolyte 80. As an example, and when electrolyte 80 includes the liquid electrolyte, reaction product 120 may precipitate from and/or within the electrolyte, as schematically and optionally illustrated. Under these conditions, reaction product removal system 130 may be configured to separate the precipitate from the electrolyte.

Reaction product removal system 130 may include any suitable structure and/or structures. As an example, the reaction product removal system may include a separation assembly 132, such as a filter, that may be configured to separate the precipitate from the electrolyte. As another example, the reaction product removal system may include a pump 134, which may be configured to provide a motive force for flow of a mixture of reaction product 120 and electrolyte 80 through the separation assembly.

As illustrated in FIGS. 1-2, reaction product removal system 130 further may include an outlet conduit 136. Outlet conduit 136 may be configured to convey an outlet stream 137, which includes reaction product 120 and electrolyte 80, from housing volume 32 and/or to separation assembly 132. As also illustrated in FIGS. 1-2, reaction product removal system 130 may include an inlet conduit 138. Inlet conduit 138 may be configured to convey an inlet stream 139, which includes a purified electrolyte 80, from separation assembly 132 and/or to housing volume 32. Purified electrolyte 80 also may be referred to herein as, or may be, a filtered electrolyte 80, and/or a separated electrolyte 80. FIGS. 1-2 illustrate reaction product removal system 130 as being external to housing 30; however, this is not required, and it is within the scope of the present disclosure that at least a portion, or even all, of reaction product removal system 130 may be internal to housing 30 and/or may extend within housing volume 32.

As also illustrated in dashed lines in FIGS. 1-2, fuel cell system 18 and/or fuel cell 20 thereof may include a reaction product recycling system 140. Reaction product recycling system 140 may be configured to receive reaction product 120, such as from fuel cell system 18, from fuel cell 20, from reaction product removal system 130, and/or from separation assembly 132, and to separate the reaction product into a recycled oxidizing agent 144 and a recycled liquid metal alloy reducing agent 148. Recycled oxidizing agent 144 may be supplied to oxidizing agent supply structure 90 and/or to oxidizing agent source 94, such as via one or more recycled oxidizing agent supply conduits 142. Recycled liquid metal alloy reducing agent 148 may be supplied to reducing agent-containment volume 42 of reducing agent-containment structure 40, such as via one or more recycled liquid metal alloy reducing agent supply conduits 146.

Reaction product recycling system 140 may include and/or be any suitable structure that may be configured to separate the reaction product into the recycled oxidizing agent and the recycled liquid metal alloy reducing agent. As examples, reaction product recycling system 140 may include and/or be an electroplating system and/or an electrowinning system.

As also illustrated in dashed lines in FIGS. 1-2, fuel cell system 18 and/or fuel cell 20 thereof further may include an inert gas supply system 150. Inert gas supply system 150, when present, may be configured to supply and/or provide an inert gas stream 152 to any suitable portion and/or component of fuel cell system 18 and/or of fuel cell 20. Inert gas stream 152 may include a purge gas, nitrogen gas, argon gas, an oxygen-free gas, and/or an oxidizing agent-free gas.

As an example, inert gas supply system 150 may provide inert gas stream 152 to reducing agent-containment structure 40 and/or to reducing agent-containment volume 42 thereof. Such a configuration may maintain a controlled, regulated, and/or inert environment within the reducing agent-containment volume and/or in contact with liquid metal alloy reducing agent 62. Additionally or alternatively, supply of the inert gas stream to the reducing agent-containment volume may compensate for a decrease in volume of the liquid metal alloy reducing agent associated with consumption of the liquid metal alloy reducing agent by the fuel cell, thereby restricting flow of ambient air and/or oxygen into the reducing agent-containment volume.

As another example, inert gas supply system 150 additionally or alternatively may provide inert gas stream 152 to housing volume 32. Such a configuration may maintain a controlled, regulated, and/or inert environment within the housing volume and/or in contact with electrolyte 80. Additionally or alternatively, supply of the inert gas stream to the reducing agent-containment volume may compensate for volumetric changes within the reducing agent-containment volume, such as may be generated by ambient temperature fluctuations, by ambient pressure fluctuations, and/or by removal of reaction product 120, such as by reaction product removal system 130.

Porous diffusion barrier 50, when utilized, may include and/or be any suitable structure that may be adapted, configured, designed, and/or constructed to define at least a portion of reducing agent-containment volume 42, to provide a physical barrier to restrict flow of liquid metal alloy reducing agent 62 from the reducing agent-containment volume and/or into electrolyte 80, to provide a physical barrier to restrict flow of gaseous oxidizing agent 92 into reducing agent-containment volume 42, to permit sodium cations (when present) and/or potassium cations (when present) to pass therethrough, and/or to permit electrolyte 80 to fluidly contact liquid metal alloy reducing agent 62, the sodium cations, and/or the potassium cations. Stated another way, porous diffusion barrier 50 may be permeable, or at least partially permeable, to electrolyte 80, to dissolved liquid metal alloy reducing agent that is dissolved within electrolyte 80, to the sodium cations (when the liquid metal alloy reducing agent includes sodium), and/or to the potassium cations (when the liquid metal alloy reducing agent includes potassium). Additionally or alternatively, porous diffusion barrier 50 also may be impermeable, or at least substantially impermeable, to liquid metal alloy reducing agent 62 and/or to oxidizing agent 92 at least when liquid metal alloy reducing agent 62 is in bulk, or liquid, form and/or when oxidizing agent 92 is in gaseous form. An example of porous diffusion barrier 50 includes a sintered glass, which also may be referred to herein as a sintered glass membrane.

Housing 30 may include and/or be any suitable structure that defines housing volume 32. Liquid metal alloy reducing agent 62, oxidizing agent 92, electrolyte 80, and/or reaction product 120 may be reactive with moisture, with water, and/or with atmospheric oxygen. Under these conditions, housing 30 may be configured to fluidly isolate housing volume 32 from an ambient environment that surrounds fuel cell 20, from water, and/or from atmospheric air. As an example, housing 30 may include and/or be a hermetically sealed housing 30.

At least a portion, or even all, of reducing agent-containment structure 40 may extend within housing volume 32 and/or may be surrounded by housing 30, as illustrated in dashed lines in FIGS. 1-2. However, this is not required. As an example, and as illustrated in solid lines in FIGS. 1-2, at least a portion of reducing agent-containment structure 40 and/or porous diffusion barrier 50 may be external to housing 30 and/or may form and/or define a boundary of housing volume 32.

Housing 30 may be formed from and/or may include any suitable material and/or materials. As examples, housing 30 may include one or more of a material that is inert to liquid metal alloy reducing agent 62, a material that is not reactive with liquid metal alloy reducing agent 62, a material that is inert to oxidizing agent 92, a material that is not reactive with oxidizing agent 92, a material that is inert to electrolyte 80, and/or a material that is not reactive with electrolyte 80. As more specific examples, housing 30 may include and/or be formed from a glass, a silicon-based glass, and/or a quartz-based glass.

Reducing agent-containment structure 40 may include and/or be any suitable structure that defines reducing agent-containment volume 42. As discussed, liquid metal alloy reducing agent 62 may be reactive with moisture, with water, and/or with atmospheric oxygen. Under these conditions, and similar to housing 30, reducing agent-containment structure 40 may be configured to fluidly isolate reducing agent-containment volume 42 from the ambient environment that surrounds fuel cell 20, from water, and/or from atmospheric air. In addition, reducing agent-containment structure 40 may be configured to retain liquid metal alloy reducing agent 62 within reducing agent-containment volume 42.

As illustrated in dashed lines in FIGS. 1-2, reducing agent-containment structure 40 may be at least partially, or even completely, immersed within electrolyte 80. However, this is not required. In addition, and as discussed, reducing agent-containment structure 40 may be located, at least partially, within housing 30 and/or may extend, at least partially, within housing volume 32. However, this is not required, and reducing agent-containment structure 40 additionally or alternatively may be external to housing 30 and/or to housing volume 32.

Reducing agent-containment structure 40 may be formed from and/or may include any suitable material and/or materials. As examples, reducing agent-containment structure 40 may include one or more of a material that is inert to liquid metal alloy reducing agent 62, a material that is not reactive with liquid metal alloy reducing agent 62, a material that is inert to oxidizing agent 92, a material that is not reactive with oxidizing agent 92, a material that is inert to electrolyte 80, and/or a material that is not reactive with electrolyte 80. As more specific examples, reducing agent-containment structure 40 may include and/or be formed from a glass, a silicon-based glass, and/or a quartz-based glass.

Anode conductor 64 may include and/or be any suitable structure and/or material that may extend in electrical contact with liquid metal alloy reducing agent 62 and/or that may be at least partially, or even completely, immersed within liquid metal alloy reducing agent 62. As examples, anode conductor 64 may include and/or be an electrically conductive material, a metal, a metallic rod, a length of stainless steel, and/or a wire.

Cathode electrode 70 may include and/or be formed from any suitable material and/or materials. As an example, cathode electrode 70 may include a catalyst 72 that may be selected to facilitate, or lower the activation energy for, reaction between oxidizing agent 92 and sodium cations and/or potassium cations (when present) that are dissolved within electrolyte 80. Examples of the catalyst include a platinum catalyst and/or a nickel catalyst.

The catalyst may be deposited on and/or may coat an outer surface of a support structure 74. Examples of the support structure include an electrically conductive support structure and/or a porous support structure. A more specific example of the support structure includes a mesh, a metallic mesh, and/or a titanium mesh.

Oxidizing agent supply structure 90 may include and/or be any suitable structure that may be configured to supply oxidizing agent 92 to housing volume 32, that may be configured to disperse oxidizing agent 92 within electrolyte 80, and/or that may be configured to saturate, or at least substantially saturate, at least a portion, region, and/or sub-volume of electrolyte 80, such as a portion, region, and/or sub-volume that is proximate oxidizing agent supply structure 90 and/or that extends proximal to cathode electrode 70, with oxidizing agent 92. As an example, and when oxidizing agent 92 is a gaseous oxidizing agent 92, oxidizing agent supply structure 90 may be configured to bubble the oxidizing agent into the electrolyte. Examples of oxidizing agent supply structure 90 include any suitable bubbler, sparger, and/or glass sparger. As another example, and when oxidizing agent 92 is a liquid oxidizing agent 92, oxidizing agent supply structure 90 may be configured to flow the oxidizing agent into a lower region of the housing volume. An example of such an oxidizing agent supply structure includes an inlet, pipe, and/or conduit that provides fluid communication between the oxidizing agent source and the lower region of housing volume 32.

As illustrated in FIGS. 1-2, oxidizing agent supply structure 90 may be located vertically below cathode electrode 70 and/or porous diffusion barrier 50, when present. Such a configuration may permit bubbles of oxidizing agent 92 to rise within electrolyte 80 and toward the cathode electrode and/or toward the porous diffusion barrier, as illustrated in FIG. 1. Additionally or alternatively, such a configuration may permit a layer, or volume, of oxidizing agent 92 to extend within the lower region of housing volume 32, as illustrated in FIG. 2.

As also illustrated in FIG. 1, cathode electrode 70 may be located between oxidizing agent supply structure 90 and porous diffusion barrier 50. However, these specific configurations are not required. As an example, oxidizing agent supply structure 90 may form a portion of reaction product removal system 130, when present, and/or may be configured to combine oxidizing agent 92 with electrolyte 80 within reaction product removal system 130.

Cathode electrical conduit 76 may include any suitable structure that may convey electrons, in the form of electrical output 22, between applied load 100 and cathode electrode 70. Examples of cathode electrical conduit 76 include an electrically conductive material and/or a wire.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

Illustrative, non-exclusive examples of fuel cells and fuel cell systems according to the present disclosure are presented in the following enumerated paragraphs.

A1. A fuel cell, comprising:
a housing defining a housing volume;
a reducing agent-containment structure defining a reducing agent-containment volume;
optionally a porous diffusion barrier that defines at least a portion of the reducing agent-containment volume, wherein the porous diffusion barrier is in fluid communication with the housing volume;
a volume of liquid sodium-potassium alloy (NaK) reducing agent, or liquid metal alloy reducing agent, extending within the reducing agent-containment volume and optionally extending in fluid contact with the porous diffusion barrier;
an anode conductor extending in electrical contact with the NaK reducing agent, or the liquid metal alloy reducing agent, such that the NaK reducing agent, or the liquid metal alloy reducing agent, forms at least a portion of an anode electrode of the fuel cell;
a cathode electrode that extends within the housing volume and spaced-apart from the NaK reducing agent, or the liquid metal alloy reducing agent;
an electrolyte present within the housing volume, extending in fluid contact with the cathode electrode, extending between the NaK reducing agent, or the liquid metal alloy reducing agent, and the cathode electrode, and optionally extending in fluid contact with the porous diffusion barrier; and
an oxidizing agent supply structure configured to supply an oxidizing agent to the housing volume.

A2. The fuel cell of paragraph A1, wherein the housing is configured to fluidly isolate the housing volume from at least one of an ambient environment that surrounds the fuel cell, water, and atmospheric air.

A3. The fuel cell of any of paragraphs A1-A2, wherein the housing volume is hermetically sealed.

A4. The fuel cell of any of paragraphs A1-A3, wherein at least a portion of the reducing agent-containment structure extends within the housing volume.

A5. The fuel cell of any of paragraphs A1-A4, wherein at least a portion of at least one of the reducing agent-containment structure and the porous diffusion barrier defines a boundary of the housing volume.

A6. The fuel cell of any of paragraphs A1-A5, wherein the housing is formed from a housing material that is inert to, or not reactive with, both the NaK reducing agent, or the liquid metal alloy reducing agent, and the oxidizing agent.

A7. The fuel cell of any of paragraphs A1-A6, wherein the housing is formed from a glass.

A8. The fuel cell of any of paragraphs A1-A7, wherein the reducing agent-containment structure is configured to retain the volume of NaK reducing agent, or liquid metal alloy reducing agent, within the reducing agent-containment volume.

A9. The fuel cell of any of paragraphs A1-A8, wherein the reducing agent-containment structure is configured to fluidly isolate the reducing agent-containment volume from at least one of an/the ambient environment that surrounds the fuel cell, water, and atmospheric air.

A10. The fuel cell of any of paragraphs A1-A9, wherein the reducing agent-containment structure is at least partially immersed within the electrolyte.

A11. The fuel cell of any of paragraphs A1-A10, wherein the reducing agent-containment structure is formed from a/the glass.

A12. The fuel cell of any of paragraphs A1-A11, wherein the porous diffusion barrier restricts flow of the NaK reducing agent, or the liquid metal alloy reducing agent, therethrough.

A13. The fuel cell of any of paragraphs A1-A12, wherein the porous diffusion barrier restricts flow of gaseous oxidizing agent therethrough.

A14. The fuel cell of any of paragraphs A1-A13, wherein the porous diffusion barrier is permeable to the electrolyte.

A15. The fuel cell of any of paragraphs A1-A14, wherein the porous diffusion barrier is permeable to dissolved NaK reducing agent, or dissolved liquid metal alloy reducing agent, that is dissolved within the electrolyte.

A16. The fuel cell of any of paragraphs A1-A15, wherein the porous diffusion barrier is formed from a sintered glass.

A17. The fuel cell of any of paragraphs A1-A16, wherein at least a portion of the anode conductor is immersed within the volume of NaK reducing agent, or liquid metal alloy reducing agent.

A18. The fuel cell of any of paragraphs A1-A17, wherein the anode conductor includes, consists of, or consists essentially of a length of stainless steel.

A19. The fuel cell of any of paragraphs A1-A18, wherein the anode conductor is electrically conductive.

A20. The fuel cell of any of paragraphs A1-A19, wherein the anode conductor includes a wire.

A21. The fuel cell of any of paragraphs A1-A20, wherein the cathode electrode includes a catalyst selected to facilitate reaction of the oxidizing agent and the NaK reducing agent, or the liquid metal alloy reducing agent.

A22. The fuel cell of paragraph A21, wherein the catalyst includes, consists of, or consists essentially of platinum.

A23. The fuel cell of any of paragraphs A21-A22, wherein the cathode electrode further includes a support structure, and further wherein the catalyst coats an external surface of the support structure.

A24. The fuel cell of paragraph A23, wherein the support structure includes a conductive support structure.

A25. The fuel cell of any of paragraph A23-A24, wherein the support structure includes a porous support structure.

A26. The fuel cell of any of paragraphs A23-A25, wherein the support structure includes, consists of, or consists essentially of a titanium mesh.

A27. The fuel cell of any of paragraphs A1-A26, wherein the electrolyte is a liquid electrolyte.

A27.1 The fuel cell of any of paragraphs A1-A27, wherein the electrolyte is electrically conductive.

A28. The fuel cell of any of paragraphs A1-A27.1, wherein the electrolyte includes, consists of, or consists essentially of propylene carbonate.

A29. The fuel cell of any of paragraphs A1-A28, wherein the electrolyte includes, consists of, or consists essentially of aluminum chloride.

A30. The fuel cell of any of paragraphs A1-A29, wherein the electrolyte includes, consists of, or consists essentially of hexafluorophosphate.

A31. The fuel cell of any of paragraphs A1-A30, wherein the electrolyte includes, consists of, or consists essentially of a solution of aluminum chloride dissolved in propylene carbonate.

A32. The fuel cell of paragraph A31, wherein the aluminum chloride has a concentration of at least one of:
(i) at least 0.1 molal, at least 0.2 molal, at least 0.3 molal, at least 0.4 molal, at least 0.5 molal, at least 0.51 molal, or at least 0.6 molal; and
(ii) at most 1 molal, at most 0.9 molal, at most 0.8 molal, at most 0.7 molal, at most 0.6 molal, at most 0.51 molal, at most 0.5 molal, or at most 0.4 molal.

A33. The fuel cell of any of paragraphs A1-A32, wherein the oxidizing agent is a/the gaseous oxidizing agent, and further wherein the oxidizing agent supply structure is configured to bubble the oxidizing agent into the electrolyte.

A34. The fuel cell of any of paragraphs A1-A33, wherein the oxidizing agent supply structure includes at least one of a bubbler, a sparger, and a glass sparger.

A35. The fuel cell of any of paragraphs A1-A34, wherein the oxidizing agent supply structure is configured to saturate, or at least substantially saturate, the electrolyte with the oxidizing agent.

A36. The fuel cell of any of paragraphs A1-A35, wherein the fuel cell further includes a cathode electrical conduit that is in electrical contact with the cathode electrode.

A37. The fuel cell of paragraph A36, wherein the cathode electrical conduit is electrically conductive.

A38. The fuel cell of any of paragraphs A36-A37, wherein the cathode electrical conduit includes a wire.

A39. The fuel cell of any of paragraphs A1-A38, wherein the fuel cell is configured to react the NaK reducing agent, or the liquid metal alloy reducing agent, with the oxidizing agent, to produce an electrical output therefrom, and to power an applied load with the electrical output.

A40. The fuel cell of paragraph A39, wherein the fuel cell includes the applied load.

A41. The fuel cell of any of paragraphs A1-A40, wherein the oxidizing agent is gaseous at atmospheric pressure.

A42. The fuel cell of any of paragraphs A1-A41, wherein the oxidizing agent is a liquid at 21 degrees Celsius and at pressures that are greater than 400 kilopascals (kPa), greater than 500 kPa, greater than 600 kPa, greater than 700 kPa, or greater than 800 kPa.

A43. The fuel cell of any of paragraphs A1-A42, wherein the oxidizing agent includes, consists of, or consists essentially of chlorine.

A44. The fuel cell of any of paragraphs A1-A43, wherein the fuel cell includes the oxidizing agent.

A45. The fuel cell of any of paragraphs A1-A44, wherein the fuel cell further includes an oxidizing agent source configured to provide the oxidizing agent to the oxidizing agent supply structure.

A46. The fuel cell of paragraph A45, wherein the oxidizing agent source includes a pressure vessel configured to maintain the oxidizing agent as a liquid oxidizing agent prior to the oxidizing agent being provided to the oxidizing agent supply structure.

A47. The fuel cell of any of paragraphs A45-A46, wherein the fuel cell includes an oxidizing agent supply conduit, which is configured to provide the oxidizing agent from the oxidizing agent source to the oxidizing agent supply structure, and further wherein the housing includes an oxidizing agent inlet configured to permit the oxidizing agent supply conduit to extend from the oxidizing agent source to the oxidizing agent supply structure.

A48. The fuel cell of any of paragraphs A1-A47, wherein the fuel cell further includes an oxidizing agent scrubber, which is configured to at least one of absorb excess oxidizing agent and react excess oxidizing agent, wherein the fuel cell further includes an excess oxidizing agent conduit configured to provide the excess oxidizing agent from the housing volume to the oxidizing agent scrubber, and further wherein the housing includes a vent opening configured to permit fluid communication between the housing volume and the excess oxidizing agent conduit.

A49. The fuel cell of any of paragraphs A1-A48, wherein the fuel cell is configured to react the NaK reducing agent, or the liquid metal alloy reducing agent, with the oxidizing agent to produce a reaction product and an/the electrical output, and further wherein the fuel cell includes a reaction product removal system configured to separate the reaction product from the electrolyte.

A50. The fuel cell of paragraph A49, wherein the reaction product is a precipitate that precipitates within the electrolyte, and further wherein the reaction product removal system includes a separation assembly configured to separate the precipitate from the electrolyte.

A51. The fuel cell of paragraph A50, wherein the separation assembly includes a filter.

A52. The fuel cell of any of paragraphs A50-A51, wherein the reaction product removal system further includes a pump configured to provide a motive force for flow of a mixture of the reaction product and the electrolyte to the separation assembly.

A53. The fuel cell of paragraph A52, wherein the reaction product removal system further includes an outlet conduit configured to convey an outlet stream, which includes the mixture of the reaction product and the electrolyte, from the housing volume to the separation assembly, and further wherein the reaction product removal system includes an inlet conduit configured to convey an inlet stream, which includes a purified electrolyte, from the separation assembly to the housing volume.

A54. The fuel cell of any of paragraphs A1-A53, wherein the NaK reducing agent is a eutectic, or at least substantially eutectic, mixture of sodium and potassium.

A55. The fuel cell of any of paragraphs A1-A54, wherein the NaK reducing agent has a potassium composition of at least one of:
(i) at least 70 weight percent (wt %), at least 72 wt %, at least 74 wt %, at least 76 wt %, at least 78 wt %, or at least 80 wt %; and
(ii) at most 90 wt %, at most 88 wt %, at most 86 wt %, at most 84 wt %, at most 82 wt %, at most 80 wt %, at most 78 wt %, or at most 76 wt %.

A56. The fuel cell of any of paragraphs A1-A55, wherein the NaK reducing agent has a sodium composition of at least one of:
(i) at least 14 wt %, at least 16 wt %, at least 18 wt %, at least 20 wt %, at least 22 wt %, or at least 24 wt %; and
(ii) at most 34 wt %, at most 32 wt %, at most 30 wt %, at most 28 wt %, at most 26 wt %, at most 24 wt %, at most 22 wt %, or at most 20 wt %.

A57. The fuel cell of any of paragraphs A1-A56, wherein the fuel cell further includes a reaction product recycling system configured to receive a/the reaction product and to separate the reaction product into a recycled oxidizing agent and a recycled NaK reducing agent, or a recycled liquid metal alloy reducing agent.

A58. The fuel cell of paragraph A57, wherein the reaction product recycling system is configured to provide the recycled NaK reducing agent, or the recycled liquid metal alloy reducing agent, to the reducing agent-containment volume of the reducing agent-containment structure.

A59. The fuel cell of any of paragraphs A1-A58, wherein the fuel cell further includes a volume of oxidizing agent, wherein the oxidizing agent is a liquid oxidizing agent, and further wherein:

(i) the volume of oxidizing agent extends within a lower region of the housing volume;

(ii) the electrolyte is phase separated from the oxidizing agent and extends in direct fluid contact with the oxidizing agent;

(iii) the volume of NaK reducing agent, or liquid metal alloy reducing agent, is phase separated from the electrolyte and extends in direct fluid contact with the electrolyte;

(iv) the electrolyte extends between the volume of oxidizing agent and the volume of NaK reducing agent, or liquid metal alloy reducing agent; and (v) the cathode electrode extends at least partially within the electrolyte.

B1. A fuel cell, comprising:
a housing defining a housing volume;
a reducing agent-containment structure defining a reducing agent-containment volume;
optionally a porous diffusion barrier that defines at least a portion of the reducing agent-containment volume, wherein the porous diffusion barrier is in fluid communication with the housing volume;
a volume of liquid metal alloy reducing agent extending within the reducing agent-containment volume and optionally in fluid contact with the porous diffusion barrier;
an anode conductor extending in electrical contact with the liquid metal alloy reducing agent such that the liquid metal alloy reducing agent forms at least a portion of an anode electrode of the fuel cell;
a cathode electrode that extends within the housing volume and spaced-apart from the liquid metal alloy reducing agent;
an electrolyte present within the housing volume, extending in fluid contact with the cathode electrode, extending between the liquid metal alloy reducing agent and the cathode electrode, and optionally extending in fluid contact with the porous diffusion barrier; and an oxidizing agent supply structure configured to supply an oxidizing agent to the housing volume.

B2. The fuel cell of paragraph B1, including any suitable structure, component, and/or feature of any fuel cell of any of paragraphs A1-A59.

INDUSTRIAL APPLICABILITY

The fuel cells disclosed herein are applicable to the electric power storage and generation industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A fuel cell, comprising:
a housing defining a housing volume;
a reducing agent-containment structure defining a reducing agent-containment volume;
a volume of liquid sodium-potassium alloy (NaK) reducing agent extending within the reducing agent-containment volume;
an anode conductor extending in electrical contact with the NaK reducing agent such that the NaK reducing agent forms at least a portion of an anode electrode of the fuel cell;
a cathode electrode that extends within the housing volume and spaced-apart from the NaK reducing agent;
an electrolyte present within the housing volume, extending in fluid contact with the cathode electrode, and extending between the NaK reducing agent and the cathode electrode; and
an oxidizing agent supply structure configured to supply an oxidizing agent to the housing volume;
wherein the fuel cell is configured to react the NaK reducing agent with the oxidizing agent to produce a reaction product and an electrical output, and further wherein the fuel cell includes a reaction product removal system configured to separate the reaction product from the electrolyte.

2. The fuel cell of claim 1, wherein the fuel cell further includes a porous diffusion barrier that defines at least a portion of the reducing agent-containment volume, wherein:
(i) the porous diffusion barrier is in fluid communication with the housing volume;
(ii) the volume of NaK reducing agent extends in fluid contact with the porous diffusion barrier; and
(iii) the electrolyte extends in fluid contact with the porous diffusion barrier.

3. The fuel cell of claim 2, wherein the porous diffusion barrier at least one of:
(i) restricts flow of the NaK reducing agent therethrough;
(ii) restricts flow of gaseous oxidizing agent therethrough;
(iii) is permeable to the electrolyte; and
(iv) is permeable to dissolved NaK reducing agent that is dissolved within the electrolyte.

4. The fuel cell of claim 1, wherein the reducing agent-containment structure is configured to fluidly isolate the reducing agent-containment volume from at least one of an ambient environment that surrounds the fuel cell, water, and atmospheric air.

5. The fuel cell of claim 1, wherein at least a portion of the anode conductor is immersed within the volume of NaK reducing agent.

6. The fuel cell of claim 1, wherein the cathode electrode includes a catalyst selected to facilitate reaction of the oxidizing agent and the NaK reducing agent.

7. The fuel cell of claim 6, wherein the catalyst includes platinum.

8. The fuel cell of claim 6, wherein the cathode electrode includes a support structure, and further wherein the catalyst coats an external surface of the support structure.

9. The fuel cell of claim 1, wherein the electrolyte is an electrically conductive liquid electrolyte.

10. The fuel cell of claim 1, wherein the electrolyte includes at least one of:
(i) propylene carbonate;
(ii) aluminum chloride; and
(iii) hexafluorophosphate.

11. The fuel cell of claim 1, wherein the electrolyte includes a solution of aluminum chloride dissolved in propylene carbonate.

12. The fuel cell of claim 1, wherein the oxidizing agent is a gaseous oxidizing agent, and further wherein the oxidizing agent supply structure is configured to bubble the oxidizing agent into the electrolyte.

13. The fuel cell of claim 1, wherein the fuel cell includes the oxidizing agent, wherein the oxidizing agent is gaseous at atmospheric pressure and is a liquid at 21 degrees Celsius and at pressures that are greater than 400 kilopascals.

14. The fuel cell of claim 1, wherein the oxidizing agent consists essentially of chlorine.

15. The fuel cell of claim 1, wherein the fuel cell further includes an oxidizing agent scrubber, which is configured to at least one of absorb excess oxidizing agent and react excess oxidizing agent, wherein the fuel cell further includes an excess oxidizing agent conduit configured to provide the excess oxidizing agent from the housing volume to the oxidizing agent scrubber, and further wherein the housing includes a vent opening configured to permit fluid communication between the housing volume and the excess oxidizing agent conduit.

16. The fuel cell of claim 1, wherein the reaction product is a precipitate that precipitates within the electrolyte, and further wherein the reaction product removal system includes a separation assembly configured to separate the precipitate from the electrolyte.

17. The fuel cell of claim 16, wherein the reaction product removal system further includes a pump configured to provide a motive force for flow of a mixture of the reaction product and the electrolyte to the separation assembly.

18. The fuel cell of claim 17, wherein the reaction product removal system further includes:
(i) an outlet conduit configured to convey an outlet stream, which includes the mixture of the reaction product and the electrolyte, from the housing volume to the separation assembly;
(ii) an inlet conduit configured to convey an inlet stream, which includes a purified electrolyte, from the separation assembly to the housing volume; and
(iii) a reaction product recycling system configured to receive a reaction product and to separate the reaction product into a recycled oxidizing agent and a recycled NaK reducing agent, wherein the reaction product recycling system is configured to provide the recycled NaK reducing agent to the reducing agent-containment volume of the reducing agent-containment structure.

19. The fuel cell of claim 1, wherein the fuel cell further includes a volume of oxidizing agent, wherein the oxidizing agent is a liquid oxidizing agent, and further wherein:
(i) the volume of oxidizing agent extends within a lower region of the housing volume;
(ii) the electrolyte is phase separated from the oxidizing agent and extends in direct fluid contact with the oxidizing agent;
(iii) the volume of NaK reducing agent is phase separated from the electrolyte and extends in direct fluid contact with the electrolyte;
(iv) the electrolyte extends between the volume of oxidizing agent and the volume of NaK reducing agent; and
(v) the cathode electrode extends at least partially within the electrolyte.

20. A fuel cell, comprising:
a housing defining a housing volume;
a reducing agent-containment structure defining a reducing agent-containment volume;
a volume of liquid sodium-potassium alloy (NaK) reducing agent extending within the reducing agent-containment volume;
an anode conductor extending in electrical contact with the NaK reducing agent such that the NaK reducing agent forms at least a portion of an anode electrode of the fuel cell;
a cathode electrode that extends within the housing volume and spaced-apart from the NaK reducing agent;
an electrolyte present within the housing volume, extending in fluid contact with the cathode electrode, and extending between the NaK reducing agent and the cathode electrode; and
an oxidizing agent supply structure configured to supply an oxidizing agent to the housing volume;
wherein the fuel cell further includes a volume of oxidizing agent, wherein the oxidizing agent is a liquid oxidizing agent, and further wherein:
(i) the volume of oxidizing agent extends within a lower region of the housing volume;
(ii) the electrolyte is phase separated from the oxidizing agent and extends in direct fluid contact with the oxidizing agent;
(iii) the volume of NaK reducing agent is phase separated from the electrolyte and extends in direct fluid contact with the electrolyte;
(iv) the electrolyte extends between the volume of oxidizing agent and the volume of NaK reducing agent; and
(v) the cathode electrode extends at least partially within the electrolyte.

21. The fuel cell of claim 20, wherein the electrolyte includes a solution of aluminum chloride dissolved in propylene carbonate.

22. The fuel cell of claim 20, wherein the fuel cell further includes an oxidizing agent scrubber, which is configured to at least one of absorb excess oxidizing agent and react excess oxidizing agent, wherein the fuel cell further includes an excess oxidizing agent conduit configured to provide the excess oxidizing agent from the housing volume to the oxidizing agent scrubber, and further wherein the housing includes a vent opening configured to permit fluid communication between the housing volume and the excess oxidizing agent conduit.

23. A fuel cell, comprising:
a housing defining a housing volume;
a reducing agent-containment structure defining a reducing agent-containment volume;
a volume of liquid sodium-potassium alloy (NaK) reducing agent extending within the reducing agent-containment volume;
an anode conductor extending in electrical contact with the NaK reducing agent such that the NaK reducing agent forms at least a portion of an anode electrode of the fuel cell;

a cathode electrode that extends within the housing volume and spaced-apart from the NaK reducing agent;

an electrolyte present within the housing volume, extending in fluid contact with the cathode electrode, and extending between the NaK reducing agent and the cathode electrode, wherein the electrolyte includes a solution of aluminum chloride dissolved in propylene carbonate; and an oxidizing agent supply structure configured to supply an oxidizing agent to the housing volume.

24. The fuel cell of claim 23, wherein the fuel cell further includes an oxidizing agent scrubber, which is configured to at least one of absorb excess oxidizing agent and react excess oxidizing agent, wherein the fuel cell further includes an excess oxidizing agent conduit configured to provide the excess oxidizing agent from the housing volume to the oxidizing agent scrubber, and further wherein the housing includes a vent opening configured to permit fluid communication between the housing volume and the excess oxidizing agent conduit.

25. A fuel cell, comprising:

a housing defining a housing volume;

a reducing agent-containment structure defining a reducing agent-containment volume;

a volume of liquid sodium-potassium alloy (NaK) reducing agent extending within the reducing agent-containment volume;

an anode conductor extending in electrical contact with the NaK reducing agent such that the NaK reducing agent forms at least a portion of an anode electrode of the fuel cell;

a cathode electrode that extends within the housing volume and spaced-apart from the NaK reducing agent;

an electrolyte present within the housing volume, extending in fluid contact with the cathode electrode, and extending between the NaK reducing agent and the cathode electrode;

an oxidizing agent supply structure configured to supply an oxidizing agent to the housing volume; and an oxidizing agent scrubber, which is configured to at least one of absorb excess oxidizing agent and react excess oxidizing agent, wherein the fuel cell further includes an excess oxidizing agent conduit configured to provide the excess oxidizing agent from the housing volume to the oxidizing agent scrubber, and further wherein the housing includes a vent opening configured to permit fluid communication between the housing volume and the excess oxidizing agent conduit.

* * * * *